United States Patent
Park et al.

(10) Patent No.: US 12,456,755 B2
(45) Date of Patent: Oct. 28, 2025

(54) ELECTROLYTE FOR LITHIUM SECONDARY BATTERY, AND LITHIUM SECONDARY BATTERY COMPRISING SAME

(71) Applicant: LG ENERGY SOLUTION, LTD., Seoul (KR)

(72) Inventors: Solji Park, Daejeon (KR); Kyoung Ho Ahn, Daejeon (KR); Junhyeok Han, Daejeon (KR); Chul Haeng Lee, Daejeon (KR); Won Kyung Shin, Daejeon (KR); Suhyeon Ji, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 554 days.

(21) Appl. No.: 17/919,055

(22) PCT Filed: Oct. 28, 2021

(86) PCT No.: PCT/KR2021/015268
§ 371 (c)(1),
(2) Date: Oct. 14, 2022

(87) PCT Pub. No.: WO2022/092831
PCT Pub. Date: May 5, 2022

(65) Prior Publication Data
US 2023/0178811 A1   Jun. 8, 2023

(30) Foreign Application Priority Data

Oct. 30, 2020   (KR) .................. 10-2020-0143242
Oct. 30, 2020   (KR) .................. 10-2020-0143254
Oct. 30, 2020   (KR) .................. 10-2020-0143269

(51) Int. Cl.
| | |
|---|---|
| *H01M 10/0569* | (2010.01) |
| *H01M 10/052* | (2010.01) |
| *H01M 10/0567* | (2010.01) |
| *H01M 10/0568* | (2010.01) |
| *H01M 50/46* | (2021.01) |

(52) U.S. Cl.
CPC ..... *H01M 10/0569* (2013.01); *H01M 10/052* (2013.01); *H01M 10/0567* (2013.01); *H01M 10/0568* (2013.01); *H01M 50/46* (2021.01); *H01M 2300/0028* (2013.01)

(58) Field of Classification Search
CPC .......... H01M 10/0569; H01M 10/052; H01M 10/0567; H01M 10/0568; H01M 50/46; H01M 2300/0028; H01M 50/105; H01M 10/4235; Y02E 60/10
See application file for complete search history.

(56) References Cited

U.S. PATENT DOCUMENTS

| | | | |
|---|---|---|---|
| 10,476,104 B2 | 11/2019 | Ahn et al. | |
| 10,700,379 B2 | 6/2020 | Ahn et al. | |
| 11,973,190 B2* | 4/2024 | Park .................. | H01M 10/0569 |
| 2009/0027603 A1* | 1/2009 | Samulski .......... | G02F 1/133711 |
| | | | 349/123 |
| 2016/0043435 A1* | 2/2016 | DeSimone ........ | H01M 10/0564 |
| | | | 429/316 |
| 2016/0190650 A1 | 6/2016 | Seo et al. | |
| 2016/0308246 A1 | 10/2016 | Swiatek | |
| 2017/0005369 A1 | 1/2017 | Nakagawa et al. | |
| 2017/0229735 A1 | 8/2017 | Ahn et al. | |
| 2018/0076488 A1 | 3/2018 | Shi et al. | |
| 2019/0058216 A1* | 2/2019 | Oh .................... | H01M 10/0565 |
| 2019/0074545 A1 | 3/2019 | Jeong et al. | |
| 2019/0198925 A1 | 6/2019 | Lee et al. | |
| 2019/0379087 A1 | 12/2019 | Oh et al. | |
| 2020/0388877 A1 | 12/2020 | Kim et al. | |
| 2021/0057780 A1 | 2/2021 | Oh et al. | |

FOREIGN PATENT DOCUMENTS

| | | |
|---|---|---|
| EP | 3419100 A1 | 12/2018 |
| EP | 3713004 A1 | 9/2020 |
| EP | 3958368 A1 | 2/2022 |
| JP | 5162803 B2 | 3/2013 |
| JP | 2017-016879 A | 1/2017 |
| JP | 2018-514070 A | 5/2018 |
| KR | 10-2016-0040127 A | 4/2016 |
| KR | 10-2016-0081109 A | 7/2016 |
| KR | 10-2016-0100958 A | 8/2016 |
| KR | 10-2018-0065958 A | 6/2018 |
| KR | 10-2018-0066724 A | 6/2018 |
| KR | 10-2018-0083272 A | 7/2018 |
| KR | 10-2019-0017477 A | 2/2019 |
| KR | 10-2019-0050709 A | 5/2019 |
| KR | 10-2019-0089280 A | 7/2019 |

(Continued)

OTHER PUBLICATIONS

Korolev, I.V., Kuzina, N.G. & Mashlyakovskii, L.N. Effect of the molecular structure of perfluoroligoetherurethaneethoxystyrenes on surface properties of coatings based on powdered UV-curable oligoetherdimethacrylates. Russ J Appl Chem 84, 2093-2099 (2011). (Year: 2011).*
International Search Report (with partial translation) and Written Opinion dated Feb. 7, 2022, issued in corresponding International Patent Application No. PCT/KR2021/015268.
European Extended Search Report dated Mar. 4, 2024 issued in European Application No. 21886825.5.

*Primary Examiner* — Maria V Ewald
*Assistant Examiner* — Suhani Jitendra Patel
(74) *Attorney, Agent, or Firm* — Morgan, Lewis & Bockius LLP

(57) ABSTRACT

The present disclosure relates to an electrolyte solution for a lithium secondary battery and a lithium secondary battery including the same. More specifically, the electrolyte solution contains the polymer compound represented by Formula 1, and thus can improve high temperature durability, stability, and lifetime characteristics of the lithium secondary battery.

20 Claims, No Drawings

(56) References Cited

FOREIGN PATENT DOCUMENTS

| KR | 10-2019-0139156 A | 12/2019 |
|---|---|---|
| KR | 10-2020-0036789 A | 4/2020 |
| WO | 2021/040392 A1 | 3/2021 |

\* cited by examiner

ELECTROLYTE FOR LITHIUM SECONDARY BATTERY, AND LITHIUM SECONDARY BATTERY COMPRISING SAME

TECHNICAL FIELD

This application claims the benefits of priorities based on Korean Patent Application No. 2020-0143242, filed on Oct. 30, 2020, Korean Patent Application No. 2020-0143254, filed on Oct. 30, 2020, and Korean Patent Application No. 2020-0143269, filed on Oct. 30, 2020, the entire contents of which are incorporated herein by reference.

The present invention relates to an electrolyte solution for a lithium secondary battery and a lithium secondary battery comprising the same.

BACKGROUND ART

Recently, with the rapid development in electric, electronic, communication, and computer industries, the demand for high performance and high safety secondary batteries is gradually increasing. In addition, in accordance with the trend of miniaturization and weight reduction of these electronic communication devices, there is a demand for thinning and miniaturizing a lithium secondary battery, which is a key component in this field.

A lithium secondary battery has high performance, but has a disadvantage that it has low discharge characteristics under harsh environments such as low or high temperatures, or under high output that requires a large amount of electricity in a short time. Moreover, in the conventional lithium secondary battery containing a non-aqueous electrolyte solution, since the non-aqueous electrolyte solution uses a solvent such as ethylene carbonate as a main component that may cause a side reaction at high voltage, there is a risk of thermal runaway or ignition.

Accordingly, researches on the development of an electrolyte solution that may improve the high-rate lifetime performance and high output characteristics through the improvement of the high temperature durability and safety of the lithium secondary battery are on the rise.

Korean Laid-open Patent Publication No. 10-2019-0017477 relates to a non-aqueous electrolyte solution for a lithium secondary battery containing a high concentration of lithium salt and an oligomer, which may reduce the resistance caused by the depletion of lithium ions during high-rate charging and discharging, thereby improving the high-temperature and low-temperature stability of the lithium secondary battery. The oligomer may also cause a pre-gelling phenomenon during wetting after injection of electrolyte solution due to the rapid reactivity of the large amount of the acrylic structure formed at the end, making it difficult to uniformly wet and form a uniform solid electrolyte interphase (SEI) of the negative electrode.

In addition, Korean Laid-open Patent Publication No. 10-2018-0083272 relates to a non-aqueous electrolyte solution for a lithium secondary battery containing an oligomer, and may improve output characteristics and safety of the lithium secondary battery. However, the oligomer may also cause a pre-gelling phenomenon during wetting after injection due to the rapid reactivity of the acrylic structure formed at the end, making it difficult to form a uniform negative electrode SEI.

Accordingly, it is necessary to develop an electrolyte solution for a lithium secondary battery that may improve the high-rate lifetime performance and high output characteristics of the battery by solving the problems of the prior art and thus improving high temperature durability and safety, and forming a uniform SEI on the positive electrode and the negative electrode.

PRIOR ART DOCUMENTS

Patent Documents (Patent Document 1) Korean Laid-open Patent Publication No. 10-2019-0017477

(Patent Document 2) Korean Laid-open Patent Publication No. 10-2018-0083272

DISCLOSURE

Technical Problem

It is an object of the present invention to provide an electrolyte solution for a lithium secondary battery containing a polymer compound capable of exhibiting high-rate lifetime performance and high output characteristics by improving the high temperature durability and safety of the lithium secondary battery and forming a uniform Solid Electrolyte Interphase (SEI) on the positive electrode or the negative electrode, and a lithium secondary battery comprising the same.

Technical Solution

In order to achieve the above objects, the present invention provides an electrolyte solution for a lithium secondary battery comprising a polymer compound represented by Formula 1 below, a lithium salt, and an organic solvent:

<Formula 1>

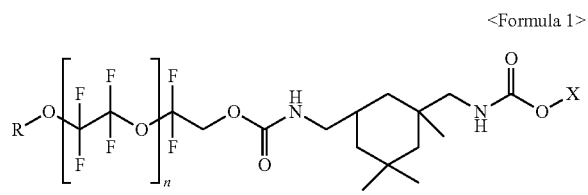

wherein n is an integer from 1 to 300, and R is hydrogen, halogen, an alkyl group having 1 to 6 carbon atoms, a halogen-substituted alkyl group having 1 to 6 carbon atoms, an alkoxy group having 1 to 6 carbon atoms, or a halogen-substituted alkoxy group having 1 to 6 carbon atoms, and X is a functional group represented by Formula 2 below:

<Formula 2>

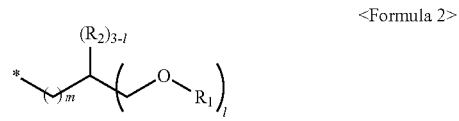

wherein m is 0 to 4, l is 1 to 3, $R_1$ and $R_2$ are each hydrogen, halogen, a saturated or unsaturated alkyl group having 1 to 6 carbon atoms, or a halogen-substituted saturated or unsaturated alkyl group having 1 to 6 carbon atoms, and each of $R_1$ and $R_2$ is the same as or different from each other.

The present invention also provides a lithium secondary battery comprising a positive electrode; a negative electrode; a separator interposed between the positive electrode and the negative electrode; and the electrolyte solution.

Advantageous Effects

The lithium secondary battery comprising the electrolyte solution for the lithium secondary battery according to the present invention has improved high temperature durability, thereby resulting in improved high-rate lifetime performance and high output characteristics.

In addition, the lithium secondary battery comprising the electrolyte solution for the lithium secondary battery exhibits an effect of enhanced safety by controlling heat generation characteristics.

In addition, in the lithium secondary battery comprising the electrolyte solution for the lithium secondary battery, as the battery is operated, a uniform SEI is formed on the positive electrode or the negative electrode, thereby exhibiting an effect of preventing an increase in resistance and improving capacity expression characteristics and lifetime characteristics.

BEST MODE

Hereinafter, the present invention will be described in more detail to help the understanding of the present invention.

The terms and words used in the present specification and claims should not be construed as limited to ordinary or dictionary terms, and should be construed in a sense and concept consistent with the technical idea of the present invention, based on the principle that the inventor may properly define the concept of a term to describe his invention in the best way possible.

Electrolyte Solution for a Lithium Secondary Battery

The present invention relates to an electrolyte solution for a lithium secondary battery.

The electrolyte solution for the lithium secondary battery according to the present invention comprises a polymer compound represented by Formula 1 below (hereinafter referred to as compound of Formula 1), a lithium salt, and an organic solvent. In addition, the electrolyte solution may further comprise an additive:

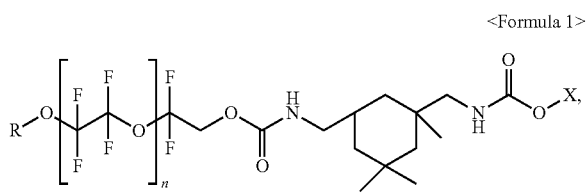

<Formula 1> wherein n is an integer from 1 to 300, and R is hydrogen, halogen, an alkyl group having 1 to 6 carbon atoms, a halogen-substituted alkyl group having 1 to 6 carbon atoms, an alkoxy group having 1 to 6 carbon atoms, or a halogen-substituted alkoxy group having 1 to 6 carbon atoms, and X is a functional group represented by Formula 2 below:

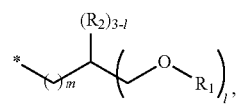

<Formula 2> wherein m is 0 to 4, l is 1 to 3, $R_1$ and $R_2$ are each hydrogen, halogen, a saturated or unsaturated alkyl group having 1 to 6 carbon atoms, or a halogen-substituted saturated or unsaturated alkyl group having 1 to 6 carbon atoms, and when two or more of $R_1$ and $R_2$ are present, each of $R_1$ and $R_2$ is the same as or different from each other. In addition, each of m and l may be an integer.

The electrolyte solution for a lithium secondary battery may be a non-aqueous electrolyte solution.

In addition, the unsaturated alkyl group may mean an unsaturated hydrocarbon.

In the present invention, the compound of Formula 1 above may improve the high temperature durability, the stability, and the high-rate lifetime characteristics of a lithium secondary battery.

The compound of Formula 1 may be contained in an amount of 0.1 to 5 wt. % based on the total weight of the electrolyte solution. Specifically, the content of the compound of Formula 1 may be 0.1 wt. % or more, 0.5 wt. % or more, or 1 wt. % or more, and 3 wt. % or less, 4 wt. % or less, or 5 wt. % or less. If the content of the compound of Formula 1 is less than 0.1 wt. %, the high temperature durability, the stability, and the high-rate lifetime characteristics of the lithium secondary battery may be deteriorated. If the content of the compound of Formula 1 exceeds 5 wt. %, the viscosity may be increased and there may be a wetting problem.

In addition, the weight-average molecular weight (Mw) of the compound of Formula 1 may be 1,000 g/mol to 35,000 g/mol. Specifically, the weight-average molecular weight (Mw) of the compound of Formula 1 may be 1,000 g/mol or more, 1,500 g/mol or more, 3,000 g/mol or more, or 4,000 g/mol or more, and 8,000 g/mol or less, 10,000 g/mol or less, 20,000 g/mol or less, or 35,000 g/mol or less. If the weight-average molecular weight (Mw) of the compound of Formula 1 is less than 1,000 g/mol, there is a problem in that the uniformity of the compounds in the battery is reduced due to intermolecular interaction. If the weight-average molecular weight (Mw) of the compound of Formula 1 is greater than 35,000 g/mol, since it is difficult to wet to the micro-pores of the electrode due to bulky molecular characteristics, there may be a problem in wettability.

Also, in the compound of Formula 2, $R_1$ and $R_2$ may each be an unsaturated alkene group, and the unsaturated alkene group may be a vinyl group. If an unsaturated alkene group is bonded to $R_1$ and/or $R_2$, since it has reactivity, a protective layer may be formed on the surface of the electrode through physical and/or chemical bonding, and as the number of vinyl groups increases, a faster and stronger protective layer may be formed.

In the present invention, the additive may comprise one or two kinds of additives. The two kinds of additives are called the first additive and the second additive, respectively.

The first additive may be a salt-based additive (salt additive), a nitrile-based compound or an ethylene carbonate-based compound.

The salt-based additive may act as an ion transporter between the positive electrode and the negative electrode, and may form radicals depending on charging/discharging behavior in the battery.

The salt-based additive may comprise at least one selected from the group consisting of $LiBF_4$, lithium bis(oxalato)borate (LiBOB), and lithium difluoro(oxalato)borate (LiODFB), lithium difluorophosphate (LiDFP), and lithium difluoro bis(oxalato)phosphate (LiDFOP).

The salt-based additive may be contained in an amount of 0.1 to 5 wt. % based on the total weight of the electrolyte solution. Specifically, the content of the salt-based additive may be 0.1 wt. % or more, 0.2 wt. % or more, or 0.3 wt. % or more, and 3 wt. % or less, 4 wt. % or less, or 5 wt. % or less. The salt-based additive may form radicals depending on charging/discharging behavior in the battery. If the content is less than 0.1 wt. %, since the number of radicals formed is small, the reactivity of the compounds may be reduced, thereby increasing the number of unreacted compounds, and thus the formation of the protective layer in the cell may be non-uniform. If the content exceeds 5 wt. %, there is a problem that an excess of radicals is formed, and accordingly, the molecular weight of the protective layer (polymer) formed on the surface of the electrode by the compound is reduced, thereby resulting in poor cell durability.

In addition, the nitrile-based compound plays a role of forming a protective layer on the positive electrode and the negative electrode, and at the same time, may capture the metal leached from the positive electrode.

The nitrile-based compound comprises at least one selected from the group consisting of succinonitrile (SN), dicyanobutene (DCB), ethylene glycol bis (propionitrile) ether (ASA3), hexane tri-cyanide (HTCN), and adipo nitrile (ADN).

In addition, the nitrile-based compound may be contained in an amount of 0.05 to 10 wt. % based on the total weight of the electrolyte solution. Specifically, the content of the first additive may be 0.05 wt. % or more, 1 wt. % or more, or 3 wt. % or more, and 6 wt. % or less, 8 wt. % or less, or 10 wt. % or less. If the content of the nitrile-based compound is less than 0.05 wt. %, the protective layer formed on the positive electrode and the negative electrode may be incomplete. If the content exceeds 10 wt. %, the resistance of the formed protective layer of the positive electrode and the negative electrode may become very large, and the mobility of lithium ions between excess unreacted additives may be reduced. If the content exceeds 10 wt. %, it may cause side effects.

In addition, the ethylene carbonate-based compound comprises vinyl ethylene carbonate (VEC) and fluoroethylene carbonate (FEC).

The ethylene carbonate-based compound may be included in an amount of 0.02 to 15 wt. % based on the total weight of the electrolyte solution. Specifically, the content of the ethylene carbonate-based compound may be 0.02 wt. % or more, 1 wt. % or more, or 3 wt. % or more, and 10 wt. % or less, 12 wt. % or less, or 15 wt. % or less. If the content of the ethylene carbonate-based compound is less than 0.02 wt. %, the protective layer formed on the negative electrode may be incomplete, and thus the performance of the battery may be deteriorated. If the content exceeds 15 wt. %, the resistance may be increased due to an excess of the additive for forming the protective layer of the negative electrode, and thus side effects may occur. The content of the VEC may be 0.01 to 5 wt. %, and the content of the FEC may be 0.01 to 10 wt. %.

If only VEC or FEC is included as the ethylene carbonate-based compound, the performance of the battery may be deteriorated due to non-uniformity of components of the protective layer of the negative electrode.

In addition, in the ethylene carbonate-based compounds, the content of VEC may be smaller than that of FEC, and specifically, the weight ratio of VEC to FEC may be 1:2 to 1:30, specifically 1:5 or less, 1:10 or less, or 1:13 or less, and 1:18 or more, 1:20 or more, or 1:25 or more. If the content is within the range of the above weight ratio, the effect of improving the high temperature durability and high-rate lifetime characteristics of the battery may be remarkably good.

In addition, the second additive may play a role in forming a protective layer on the surfaces of the positive and negative electrodes, and comprises compounds that may be used together with the first additive to suppress the occurrence of side reactions at the positive electrode and the negative electrode.

The type of the second additives may vary depending on the type of the first additives.

If the first additive is a salt-based additive, the second additive may comprise at least one selected from the group consisting of vinyl ethylene carbonate (VEC), vinylene carbonate (VC), fluoroethylene carbonate (FEC), polysiloxane (PS), ethylene sulfate (ESa), succinonitrile (SN), oxalyldifluoroborate (ODFB), dicyclohexylcabodiimide (DCC), 1,3-propene sultone (PRS), ethylene glycol bis (propionitrile) ether (ASA3), adipo nitrile (ADN), hexane tri-cyanide (HTCN), dicyanobutene (DCB), fluoro benzene (FB), and propargyl 1H-imidazole-1-carboxylate (PIC). Among the second additives, DCC does not directly form a protective layer of the negative electrode, but inhibits the production of HF and inhibits the production of by-products induced from salt anions, and ultimately, it may be expected to have an effect of improving resistance by suppressing side reactions in the film of the positive electrode and the negative electrode.

In addition, if the first additive is a nitrile-based compound, the second additive may comprise at least one selected from the group consisting of vinyl ethylene carbonate (VEC), vinylene carbonate (VC), fluoroethylene carbonate (FEC), polysiloxane (PS), ethylene sulfate (ESa), oxalyldifluoroborate (ODFB), dicyclohexylcabodiimide (DCC), 1,3-Propene sultone (PRS), fluoro benzene (FB), and propargyl 1H-imidazole-1-carboxylate (PIC). Among the second additives, DCC does not directly form a protective layer of the negative electrode, but inhibits the production of HF and inhibits the production of by-products induced from salt anions, and ultimately, it may be expected to have an effect of improving resistance by suppressing side reactions in the film of the positive electrode and the negative electrode.

In addition, if the first additive is an ethylene carbonate-based compound, the second additive may comprise at least one selected from the group consisting of vinylene carbonate (VC), polysiloxane (PS), ethylene sulfate (ESa), succinonitrile (SN), oxalyldifluoroborate (ODFB), dicyclohexylcabodiimide (DCC), 1,3-propene sultone (PRS), ethylene glycol bis (propionitrile) ether (ASA3), adipo nitrile (ADN), hexane tri-cyanide (HTCN), dicyanobutene (DCB), fluoro benzene (FB), and propargyl 1H-imidazole-1-carboxylate (PIC). Among the second additives, the dichlorohexylcarbodiimide (DCC) does not directly form a negative electrode passivation layer, but inhibits HF production and inhibits production of by-products resulting from salt anions, and ultimately it can be expected to have an effect of improving resistance by suppressing side reactions at the positive electrode and a protective layer of the negative electrode.

In addition, the second additive may be contained in an amount of 5 to 30 wt. % based on the total weight of the electrolyte solution. Specifically, the content of the second additive may be 5 wt. % or more, 10 wt. % or more, or 15 wt. % or more, and 20 wt. % or less, 25 wt. % or less, or 30 wt. % or less. If the content of the second additive is within the above range, it does not affect the oxidation safety of the electrolyte solution and the heating value due to the decomposition reaction (including both Faradaic & non-Faradaic) of the electrolyte solution, and also, in order to protect the surface of the negative electrode during initial activation, there may be an effect that most of it is consumed and decomposed, and thus does not remain.

In the present invention, the lithium salt is used to provide lithium ion, and is not particularly limited as long as it is a compound capable of providing lithium ion in a lithium secondary battery.

If the lithium salt according to the present invention is used together with the first and/or second additives as described above, it is possible to stably form a SEI film on the negative electrode and also form a stable film on the surface of the positive electrode, and thus it is possible to control the side reaction caused by the decomposition of the electrolyte solution at high temperature.

In the present invention, the lithium salt may comprise at least one selected from the group consisting of $LiPF_6$, lithium bis(fluorosulfonyl) imide (LiFSI), and lithium bis (trifluoromethanesulfonyl)imide (LiTFSI).

In addition, the lithium salt may be included in a concentration of 0.8M to 2M in the electrolyte solution, and specifically, the concentration of the lithium salt may be 0.8M or more, 1.0M or more, or 1.2M or more, and 1.5M or less, 1.8M or less, or 2.0M or less. If the concentration of the lithium salt is less than 0.8M, since the supply of lithium ions is not smooth and the ionic conductivity is lowered, there may be a problem in the kinetic of the electrolyte solution. If the concentration of the lithium salt exceeds 2.0M, cell performance may be deteriorated due to deterioration of physical properties by an increase in viscosity.

In addition, the content of the lithium salt may be 10 wt. % to 30 wt. %, specifically, 10 wt. % or more, or 13 wt. % or more, and 20 wt. % or less, or 30 wt. % or less, based on the total weight of the electrolyte solution for the lithium secondary battery.

In the present invention, the organic solvent is not particularly limited as long as it is a solvent commonly used in the electrolyte solution for a lithium secondary battery.

In the present invention, the organic solvent may be a non-aqueous organic solvent comprising at least one selected from the group consisting of a carbonate-based organic solvent, an ester-based organic solvent, an ether-based organic solvent, a propionate-based organic solvent and a fluorine-based organic solvent.

The non-aqueous organic solvent may comprise at least one selected from the group consisting of propylene carbonate, ethylene carbonate, diethyl carbonate, dimethyl carbonate, ethyl methyl carbonate, methyl propyl carbonate, dipropyl carbonate, fluoro-ethylene carbonate, dimethyl sulfoxide, acetonitrile, dimethoxyethane, diethoxyethane, vinylene carbonate, sulfolane, gamma-butyrolactone, propylene sulfite, tetrahydrofuran, methyl formate, methyl acetate, ethyl acetate, isopropyl acetate, isoamyl acetate, methyl propionate, ethyl propionate, propyl propionate, butyl propionate, methyl butylate and ethyl butylate, or a mixture of two or more thereof. Preferably, the non-aqueous organic solvent may comprise at least one selected from the group consisting of ethylene carbonate (EC), propylene carbonate (PC), ethyl propionate (EP), and propyl propionate (PP).

In addition, the content of the organic solvent is 40 wt. % to 90 wt. %, specifically, 40 wt. % or more, 50 wt. % or more, or 60 wt. % or more, and 70 wt. % or less, 75 wt. % or less, or 80 wt. % or less, 85 wt. % or less, or 90 wt. % or less, based on the total weight of the electrolyte solution for a lithium secondary battery.

Lithium Secondary Battery

The present invention also relates to a lithium secondary battery comprising a positive electrode, a negative electrode, a separator interposed between the positive electrode and the negative electrode, and an electrolyte solution.

The lithium secondary battery of the present invention can be prepared by injecting the electrolyte solution as described above into an electrode assembly which is formed by sequentially stacking a positive electrode, a negative electrode and a separator selectively interposed between the positive electrode and the negative electrode. In this case, as the positive electrode, the negative electrode, and the separator constituting the electrode assembly, those commonly used in the manufacture of a lithium secondary battery may be used.

The positive electrode and the negative electrode constituting the lithium secondary battery of the present invention may be manufactured and used in a conventional manner.

First, the positive electrode may be manufactured by forming a mixture layer for the positive electrode on the positive electrode current collector. The mixture layer for the positive electrode may be formed by coating a slurry for the positive electrode comprising a positive electrode active material, a binder, an electrically conductive material, and a solvent on a positive electrode current collector, and drying and rolling them.

The positive electrode current collector is not particularly limited as long as it has electrical conductivity without causing a chemical change in the battery, and for example, stainless steel, aluminum, nickel, titanium, sintered carbon; or aluminum or stainless steel surface-treated with carbon, nickel, titanium, silver or the like may be used as the positive electrode current collector.

The positive electrode active material is a compound capable of reversibly intercalating and de-intercalating lithium, and specifically, may comprise lithium composite metal oxide comprising lithium and at least one metal such as cobalt, manganese, nickel, or aluminum. More specifically, the lithium composite metal oxide may be lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (wherein $0<Y<1$), $LiMn_{2-z1}Ni_{z}O_4$ (wherein $0<Z<2$) etc.), lithium-nickel-cobalt-based oxide (e.g., $LiNi_{1-Y1}Co_{Y1}O_2$ (wherein $0<Y1<1$) etc.), lithium-manganese-cobalt-based oxide (e.g., $LiCo_{1-Y2}Mn_{Y2}O_2$ (wherein $0<Y2<1$), $LiMn_{2-z1}Co_{z1}O_4$ (wherein $0<Z1<2$) etc.), lithium-nickel-manganese-cobalt-based oxide (e.g., $Li(Ni_pCo_qMn_{r1})O_2$ (wherein $0<p<1$, $0<q<1$, $0<r1<1$, $p+q+r1=1$) or $Li(Ni_{p1}Co_{q1}Mn_{r2})O_4$ (wherein $0<p1<2$, $0<q1<2$, $0<r2<2$, $p1+q1+r2=2$) etc.), or lithium-nickel-cobalt-transition metal (M) oxide (e.g., $Li(Ni_{p2}Co_{q2}Mn_{r3}M_{s2})O_2$ (wherein M is selected from the group consisting of Al, Fe, V, Cr, Ti, Ta, Mg and Mo, p2, q2, r3 and s2 is the atomic fraction of each independent element, wherein $0<p2<1$, $0<q2<1$, $0<r3<1$, $0<s2<1$, and $p2+q2+r3+s2=1$) etc.), and any one or two or more of these compounds may be comprised.

Among these, when considering that the capacity characteristics and stability of the battery can be increased, the lithium composite metal oxide may be $LiCoO_2$, $LiMnO_2$, LiNiO$_2$, lithium nickel manganese cobalt oxide (e.g., Li(Ni$_{1/3}$Mn$_{1/3}$Co$_{1/3}$)O$_2$, Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn0.15Co$_{0.15}$)O$_2$, and Li(Ni$_{0.8}$Mn$_{0.1}$CO$_{0.1}$)O$_2$ etc.), or lithium nickel cobalt aluminum oxide (e.g., Li(Ni$_{0.8}$Co$_{0.15}$Al$_{0.05}$)O$_2$ etc.).

The positive electrode active material may be contained in an amount of 80 wt. % to 99 wt. %, based on the total weight of the solids in the slurry for the positive electrode.

The binder is a component that assists in bonding of an active material and an electrically conductive material, and bonding to a current collector, and usually is added in an amount of 1 to 30 wt. % based on the total weight of solids in the slurry for the positive electrode. Examples of such binder may comprise polyvinylidene fluoride (PVDF), polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated-EPDM, styrene-butadiene rubber, fluorine rubber, and various copolymers.

The electrically conductive material may typically be added in an amount of 1 to 30 wt. % based on the total weight of solids in the slurry for the positive electrode.

The electrically conductive material is not particularly limited as long as it has electrical conductivity without causing chemical change in the battery, and for example, graphite; carbon-based material such as carbon black, acetylene black, Ketjen black, channel black, furnace black, lamp black, and thermal black; electrically conductive fibers such as carbon fibers and metal fibers; metal powders such as carbon fluoride, aluminum, and nickel powder; electrically conductive whiskers such as zinc oxide and potassium titanate; electrically conductive metal oxides such as titanium oxide; electrically conductive materials such as polyphenylene derivatives can be used. Specific examples of commercially available electrically-conductive materials may comprise acetylene black series of products from Chevron Chemical Company or Denka black (Denka Singapore Private Limited), products from Gulf Oil Company, Ketjen black, EC series (products from Armak Company), Vulcan XC-72 (products from Cabot Company) and Super P (products of Timcal Company).

The solvent may comprise an organic solvent such as N-methyl-2-pyrrolidone (NMP), and may be used in an amount to achieve a desirable viscosity when the positive electrode active material, and optionally the binder, the electrically conductive material and the like are comprised. For example, the solvent may be comprised in an amount such that the concentration of solids in the slurry containing the positive electrode active material, and optionally the binder and the electrically conductive material is 50 to 95 wt. %, preferably 70 to 95 wt. %.

In addition, the negative electrode may be manufactured by forming a mixture layer for the negative electrode on the negative electrode current collector. The mixture layer for the negative electrode may be formed by coating a slurry containing a negative electrode active material, a binder, an electrically conductive material, and a solvent on a negative electrode current collector, and then drying and rolling it.

The negative electrode current collector generally has a thickness of 3 to 500 μm. This negative electrode current collector is not particularly limited as long as it has high electrical conductivity without causing chemical changes in the battery. For example, copper, stainless steel, aluminum, nickel, titanium, sintered carbon; copper or stainless steel whose surface is treated with carbon, nickel, titanium, silver or the like; aluminum-cadmium alloy or the like may be used as the negative electrode current collector. In addition, as with the positive electrode current collector, the negative electrode current collector can be strengthened in the bonding force with the negative electrode active material by forming fine irregularities on the surface, and can be used in various forms such as film, sheet, foil, net, porous body, foam, nonwoven fabric and the like.

In addition, the negative electrode active material may also comprise a single material selected from the group consisting of lithium-containing titanium composite oxide (LTO); carbon-based materials such as non-graphitizable carbons, graphitizable carbon, etc.; metal composite oxides such as Li$_x$Fe$_2$O$_3$ (0≤x≤1), Li$_x$WO$_2$ (0≤x≤1), Sn$_x$Me$_{1-x}$Me'$_y$O$_z$ (Me: Mn, Fe, Pb, Ge; Me': Al, B, P, Si, elements of groups 1, 2, and 3 of the periodic table, halogen; 0≤x≤1; 1≤y≤3; 1≤z≤8); lithium metal; lithium alloy; silicon-based alloy; tin-based alloy; metal oxides such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, and Bi$_2$O$_5$; and an electrically conductive polymer such as polyacetylene, or a mixture of two or more thereof.

The negative electrode active material may be contained in an amount of 80 wt. % to 99 wt. % based on the total weight of solids in the slurry for the negative electrode.

The binder is a component that assists in bonding between the electrically conductive material, the active material, and the current collector, and is usually added in an amount of 1 to 30 wt. % based on the total weight of solids in the slurry for the negative electrode. Examples of such binder may comprise polyvinylidene fluoride (PVDF), polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof.

The electrically conductive material is a component for further improving the electrical conductivity of the negative electrode active material, and may be added in an amount of 1 to 20 wt. % based on the total weight of solids in the slurry for the negative electrode. The electrically conductive material is not particularly limited as long as it has electrical conductivity without causing chemical changes in the relevant battery, and for example, graphite such as natural graphite or artificial graphite; carbon blacks such as acetylene black, Ketjen black, channel black, furnace black, lamp black, and thermal black; electrically conductive fibers such as carbon fiber and metal fiber; metal powders such as carbon fluoride, aluminum and nickel powder; electrically conductive whiskers such as zinc oxide and potassium titanate; electrically conductive metal oxides such as titanium oxide; polyphenylene derivatives can be used.

The solvent may include water or an organic solvent such as NMP or alcohol, and may be used in an amount to achieve a desirable viscosity when the negative electrode active material, and optionally the binder, the electrically conductive material and the like are comprised. For example, the solvent may be comprised in an amount such that the concentration of solids in the slurry containing the negative electrode active material, and optionally the binder and the electrically conductive material is 50 to 95 wt. %, preferably 70 to 90 wt. %.

In addition, the separator serves to block the internal short circuit of both electrodes and impregnate the electrolyte solution. In addition, the separator may be formed as a separator film by mixing a polymer resin, a filler, and a solvent to prepare a composition for the separator, and then directly coating and drying the composition for the separator on an upper portion of the electrode, or may be formed by casting and drying the composition for the separator on a support, and laminating a separator film peeled from the support on an upper portion of the electrode.

As the separator, a porous polymer film commonly used, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethylene terephthalate fiber or the like with high melting point can be used, but are not limited thereto.

In this case, the diameter of the pores of the porous separator is generally 0.01 to 50 μm, the porosity may be 5 to 95%. In addition, the thickness of the porous separator may be generally in the range of 5 to 300 μm.

The external shape of the lithium secondary battery of the present invention is not particularly limited, but may be a cylindrical shape using a can, a rectangular shape, a pouch shape, a coin shape, or the like.

Hereinafter, preferred Examples are presented to help the understanding of the present invention. However, it will be apparent to those skilled in the art that following Examples are merely illustrative of the present invention, and various changes and modifications are possible within the scope and spirit of the present invention, and it goes without saying that such changes and modifications fall within the scope of the appended claims.

According to the composition as shown in Table 1 below, electrolyte solutions for the lithium secondary battery of Examples 1 to 3 and Comparative Examples 1 to 2 were prepared.

Example 1

(1-1) Preparation of Non-Aqueous Electrolyte Solution

According to the composition shown in Table 1, a non-aqueous electrolyte solution was prepared in the following way.

As an organic solvent, ethylene carbonate (EC), polypropylene carbonate (PC), ethyl propionate (EP), and propyl propionate (PP) were mixed in a weight ratio of 2:1:2:5 (EC:PC:EP:PP) to prepare a mixed organic solvent.

A mixed solution was prepared by dissolving 1.2 M of $LiPF_6$ as a lithium salt in the mixed organic solvent.

To the mixed solution, the compound of Formula 1 (n=3, R: $CF_3CF_2CF_2$—, X: the compound of Formula 2 (m=0, l=3. R1: $CH_2CH=CH_2$)), the first additive, and the second additive were added to prepare a non-aqueous electrolyte solution.

As the first additive, lithium bis(oxalate)borate (LiBOB) was added.

As the second additive, vinyl ethylene carbonate (VEC), polysiloxane (PS), fluoroethylene carbonate (FEC), succinonitrile (SN), hexane tricarbonitrile (HTCN), oxalyldifluoroborate (ODFB), and dicyclohexylcabodiimide (DCC) were added to prepare an electrolyte solution.

(1-2) Preparation of Lithium Secondary Battery

To 100 parts by weight of N-methyl-2-pyrrolidone (NMP), 40 parts by weight of solids obtained by mixing a ternary active material ($Li(Ni_{0.5}Mn_{0.3}Co_{0.2})O_2$) as a positive electrode active material, carbon black as an electrically conductive material, and polyvinylidene fluoride (PVDF) as a binder in the ratio of 90:5:5 (wt. %) were added to prepare a slurry for the positive electrode active material. The slurry for the positive electrode active material was applied to a positive electrode current collector (Al thin film) having a thickness of 100 μm, and then dried and press-rolled to prepare a positive electrode.

To 100 parts by weight of NMP, 100 parts by weight of solids obtained by mixing graphene as a negative electrode active material, PVDF as a binder, and carbon black as an electrically conductive material in the ratio of 90:5:2:3 (wt. %) were added to prepare a slurry for the negative electrode active material. The slurry for the negative electrode active material was applied to a negative electrode current collector (Cu thin film) having a thickness of 90 μm, dried and press-rolled to prepare a negative electrode.

The positive electrode and the negative electrode prepared by the above method were laminated together with a safety reinforced separator (SRS®, LG Chem) to prepare an electrode assembly, and then the electrode assembly was placed in a pouch-type battery case, and the prepared non-aqueous electrolyte solution was respectively injected and sealed to prepare a lithium secondary battery with 4.45V, 4,500 mAh.

Example 2

A non-aqueous electrolyte solution and a lithium secondary battery were prepared in the same manner as in Example 1, except that lithium difluoro bis(oxalato)phosphate (LiDFPO) was used instead of LiBOB as the first additive.

Example 3

A non-aqueous electrolyte solution and a lithium secondary battery were prepared in the same manner as in Example 1, except that lithium tetrafluoroborate (LiBF4) was used instead of LiBOB as the first additive.

TABLE 1

| Unit: wt. % | Organic solvent EC/PC/EP/PP | Lithium salt $LiPF_6$ (1.2M) | First additive | | VEC | PS | FEC | SN | HTCN | ODFB | DCC | Compound of Formula 1 |
|---|---|---|---|---|---|---|---|---|---|---|---|---|
| | | | | | \multicolumn{7}{c|}{Second additive} | |
| Example 1 | To 100 | 15.1 | LiBOB | 0.5 | 0.5 | 4 | 7 | 2 | 3 | 0.5 | 0.1 | 2 |
| Example 2 | | | LiDFOP | 0.5 | 0.5 | 4 | 7 | 2 | 3 | 0.5 | 0.1 | 2 |
| Example 3 | | | $LiBF_4$ | 0.5 | 0.5 | 4 | 7 | 2 | 3 | 0.5 | 0.1 | 2 |
| Comparative Example 1 | | | LiBOB | 0.5 | 0.5 | 4 | 7 | 2 | 3 | 0.5 | 0.1 | — |
| Comparative Example 2 | | | — | — | 0.5 | 4 | 7 | 2 | 3 | 0.5 | 0.1 | 2 |

Comparative Example 1

A non-aqueous electrolyte solution and a lithium secondary battery were prepared in the same manner as in Example 1, except that the compound of Formula 1 was not used.

Comparative Example 2

A non-aqueous electrolyte solution and a lithium secondary battery were prepared in the same manner as in Example 1, except that LiBOB, which is the first additive, was not used.

Experimental Example 1: Measurement of High Temperature Performance and Lifetime Characteristics Lithium secondary batteries prepared in Examples and Comparative Examples were operated under a voltage condition of 3V to 4.45V to measure recovery capacity, low temperature lifetime, heating value, and hot box improvement degree in the following manner, and then the results are shown in Table 2 below.

(1) Recovery Capacity

The lithium secondary batteries prepared in Examples and Comparative Examples were fully charged to SOC 100% (4356 mAh) under a voltage of 4.45 V. Thereafter, the temperature was increased from 25° C. to 60° C. at a temperature increase rate of 0.7° C./min, and then stored at a high temperature for 7 days under a temperature of 60° C. and a humidity of 90%, and then the recovery capacity at 1C charging and 1C discharging (1C=4356 mA) was measured.

(2) Lifetime Characteristics

The lifetime characteristics of the lithium secondary batteries at low temperature (15° C.), room temperature (25° C.), and high temperature (60° C.) were measured by charging at 2C and discharging at 1C at 15° C., 25° C. and 60° C., respectively.

(3) Heating Value

Heating values were measured by measuring internal heating values of lithium secondary batteries using MMC equipment (Multiple Module calorimeter, NETZSCH company, MMC274 MMC 274). Using Equation 1 below, a relative heating value (%) was calculated compared to the lithium secondary battery of Comparative Example 1 containing a non-aqueous electrolyte solution.

(Heating value of secondary battery after storage at 150° C. for 100 minutes/Heating value of lithium secondary battery of Comparative Example 1 after storage at 150° C. for 100 minutes)×100     <Equation 1>

(4) Hot Box Experiment

The lithium secondary batteries were left in a high-temperature oven at 135° C. and 140° C. at a temperature increase rate of 5° C./min for 1 hour to evaluate the state of the batteries. A case in which ignition or explosion did not occur was judged as Pass, and a case in which ignition or explosion occurred was judged as Fail.

TABLE 2

|  | Recovery capacity | Lifetime characteristics (%) | | | Heating value | Hot box experiment | |
| --- | --- | --- | --- | --- | --- | --- | --- |
|  |  | Low temperature | Room temperature | High temperature |  |  |  |
|  | (%) | (200th) | (800th) | (600th) | (%) | 135° C. | 140° C. |
| Example 1 | 94.5 | 88.2 | 87.7 | 82.2 | 58 | Pass | Pass |
| Example 2 | 90.8 | 87.1 | 86.9 | 82.0 | 63 | Pass | Pass |
| Example 3 | 92.2 | 87.3 | 87.2 | 81.8 | 76 | Pass | Pass |
| Comparative Example 1 | 81.9 | 84.7 | 79.4 | 81.4 | 100 | Fail | Fail |
| Comparative Example 2 | 89.6 | 86.0 | 85.5 | 81.7 | 79 | Pass | Pass |

As a result, it was confirmed that in the case of Examples 1 to 3, the recovery capacity was improved compared to Comparative Examples 1 and 2.

In addition, it was confirmed that in the case of Examples 1 to 3, the low and room temperature lifetime characteristics were improved, and the high temperature lifetime characteristics were equivalent or superior compared to Comparative Examples 1 and 2.

In addition, it was confirmed that in the case of Examples 1 to 3, the heating values were reduced compared to Comparative Examples 1 and 2.

According to the composition as shown in Table 3 below, electrolyte solutions for the lithium secondary battery in Examples 4 to 6 and Comparative Examples 3 to 4 were prepared.

TABLE 3

| Unit: wt. % | Organic solvent EC/PC/EP/PP | Lithium salt LiPF$_6$ (1.2M) | First additive | | | Second additive | | | | | Compound of Formula 1 |
| --- | --- | --- | --- | --- | --- | --- | --- | --- | --- | --- | --- |
|  |  |  | SN | HTCN | DCB | VEC | PS | FEC | ODFB | DCC |  |
| Example 4 | To 100 | 15.1 | 2 | 3 | — | 0.5 | 4 | 7 | 0.5 | 1 | 2 |
| Example 5 |  |  | — | 1.5 | 1 | 0.5 | 4 | 7 | 0.5 | 1 | 2 |

TABLE 3-continued

| Unit: wt. % | Organic solvent EC/PC/EP/PP | Lithium salt LiPF$_6$ (1.2M) | First additive | | | Second additive | | | | | Compound of Formula 1 |
|---|---|---|---|---|---|---|---|---|---|---|---|
| | | | SN | HTCN | DCB | VEC | PS | FEC | ODFB | DCC | |
| Example 6 | | | 2 | — | 3 | 0.5 | 4 | 7 | 0.5 | 1 | 2 |
| Comparative Example 3 | | | 2 | 3 | — | 0.5 | 4 | 7 | 0.5 | 1 | — |
| Comparative Example 4 | | | — | — | — | 0.5 | 4 | 7 | 0.5 | 1 | 2 |

Example 4

(1-1) Preparation of Non-Aqueous Electrolyte Solution

As an organic solvent, ethylene carbonate (EC), polypropylene carbonate (PC), ethyl propionate (EP), and propyl propionate (PP) were mixed in a weight ratio of 2:1:2:5 (EC:PC:EP:PP) to prepare a mixed organic solvent.

A mixed solution was prepared by dissolving 1.2 M of LiPF$_6$ as a lithium salt in the mixed organic solvent.

To the mixed solution, the compound of Formula 1 (n=3, R: CF$_3$CF$_2$CF$_2$—, X: the compound of Formula 2 (m=0, l=3. R1: CH$_2$CH=CH$_2$)), the first additive, and the second additive were added to prepare a non-aqueous electrolyte solution.

As the first additive, succinonitrile (SN) and hexane tri-cyanide (HTCN) were added.

As the second additive, vinyl ethylene carbonate (VEC), polysiloxane (PS), fluoroethylene carbonate (FEC), oxalyldifluoroborate (ODFB), and dicyclohexylcabodiimide were added to prepare an electrolyte solution.

(1-2) Preparation of Lithium Secondary Battery

To 100 parts by weight of N-methyl-2-pyrrolidone (NMP), 40 parts by weight of solids obtained by mixing a ternary active material (Li(Ni$_{0.5}$Mn$_{0.3}$Co$_{0.2}$)O$_2$) as a positive electrode active material, carbon black as an electrically conductive material, and polyvinylidene fluoride (PVDF) as a binder in the ratio of 90:5:5 (wt. %) were added to prepare a slurry for the positive electrode active material. The slurry for the positive electrode active material was applied to a positive electrode current collector (Al thin film) having a thickness of 100 μm, and then dried and press-rolled to prepare a positive electrode.

To 100 parts by weight of NMP, 100 parts by weight of solids obtained by mixing graphene as a negative electrode active material, PVDF as a binder, and carbon black as an electrically conductive material in the ratio of 90:5:2:3 (wt. %) were added to prepare a slurry for the negative electrode active material. The slurry for the negative electrode active material was applied to a negative electrode current collector (Cu thin film) having a thickness of 90 μm, dried and press-rolled to prepare a negative electrode.

The positive electrode and the negative electrode prepared by the above method were laminated together with a safety reinforced separator (SRS®, LG Chem) to prepare an electrode assembly, and then the electrode assembly was placed in a pouch-type battery case, and the prepared non-aqueous electrolyte solution was respectively injected and sealed to prepare a lithium secondary battery with 4.45V, 4,500 mAh.

Example 5

A non-aqueous electrolyte solution and a lithium secondary battery were prepared in the same manner as in Example 4, except that 1.5 wt. % of HTCN and 1 wt. % of dicyanobutene (DCB) were used instead of SN and HTCN as the first additive.

Example 6

A non-aqueous electrolyte solution and a lithium secondary battery were prepared in the same manner as in Example 4, except that 2 wt. % of SN and 3 wt. % of DCB were used instead of SN and HTCN as the first additive.

Comparative Example 3

A non-aqueous electrolyte solution and a lithium secondary battery were prepared in the same manner as in Example 4, except that the compound of Formula 1 was not used.

Comparative Example 4

A non-aqueous electrolyte solution and a lithium secondary battery were prepared in the same manner as in Example 4, except that SN and HTCN as the first additive was not used.

Experimental Example 2: Measurement of High Temperature Performance and Lifetime Characteristics Lithium secondary batteries prepared in Examples 4 to 6 and Comparative Examples 3 and 4 were operated under a voltage condition of 3V to 4.45V to measure recovery capacity, low temperature lifetime, heating value, and hot box improvement degree in the same manner as in Experimental Example 1, and then the results are shown in Table 4 below. At this time, the relative heating value (%) was calculated as a relative heating value compared to the lithium secondary battery of Comparative Example 3 instead of Comparative Example 1 in Equation 1 above.

TABLE 4

| | Lifetime characteristics (%) | | | | | Hot box experiment | |
|---|---|---|---|---|---|---|---|
| | Recovery capacity | Low temperature | Room temperature | High temperature | Heating value | | |
| | (%) | (200th) | (800th) | (600th) | (%) | 135° C. | 140° C. |
| Example 4 | 89.6 | 86.0 | 85.5 | 81.7 | 44 | Pass | Pass |
| Example 5 | 92.8 | 87.6 | 88.0 | 83.4 | 43 | Pass | Pass |
| Example 6 | 92.5 | 87.1 | 86.9 | 83.8 | 38 | Pass | Pass |
| Comparative Example 3 | 72.6 | 80.2 | >60 | >60 | 100 | Fail | Fail |
| Comparative Example 4 | 79.2 | 80.5 | >60 | >60 | 77 | Pass | Fail |

As a result, it was confirmed that in the case of Examples 4 to 6, the recovery capacity was improved compared to Comparative Examples 3 and 4. In addition, it was confirmed that in the case of Examples 4 to 6, the low, room, and high temperature lifetime characteristics were improved, and the high temperature lifetime characteristics were equivalent or superior compared to Comparative Examples 3 and 4.

In addition, it was confirmed that in the case of Examples 4 to 6, the heating values were reduced compared to Comparative Examples 3 and 4.

According to the composition as shown in Table 5 below, electrolyte solutions in Examples 7 to 9 and Comparative Examples 5 to 7 were prepared.

TABLE 5

| Unit: wt. % | Organic solvent EC/PC/EP/PP | Lithium salt LiPF$_6$ (1.2M) | First additive | | Second additive | | | | | Compound of Formula 1 |
|---|---|---|---|---|---|---|---|---|---|---|
| | | | VEC | FEC | PS | SN | HTCN | ODFB | DCC | |
| Example 7 | To 100 | 15.1 | 0.5 | 7 | 4 | 2 | 3 | 0.5 | 0.1 | 2 |
| Example 8 | | | 1.5 | 7 | 4 | 2 | 3 | 0.5 | 0.1 | 2 |
| Example 9 | | | 0.5 | 5 | 4 | 2 | 3 | 0.5 | 0.1 | 2 |
| Comparative Example 5 | | | 0.5 | 7 | 4 | 2 | 3 | 0.5 | 0.1 | — |
| Comparative Example 6 | | | 0.5 | — | 4 | 2 | 3 | 0.5 | 0.1 | 2 |
| Comparative Example 7 | | | — | 7 | 4 | 2 | 3 | 0.5 | 0.1 | 2 |

Example 7

(1-1) Preparation of Non-Aqueous Electrolyte Solution

According to the composition shown in Table 5 above, a non-aqueous electrolyte solution was prepared in the following way.

As an organic solvent, ethylene carbonate (EC), polypropylene carbonate (PC), ethyl propionate (EP), and propyl propionate (PP) were mixed in a weight ratio of 2:1:2:5 (EC:PC:EP:PP) to prepare a mixed organic solvent.

A mixed solution was prepared by dissolving 1.2 M of LiPF$_6$ as a lithium salt in the mixed organic solvent.

To the mixed solution, the compound of Formula 1 (n=3, R: $CF_3CF_2CF_2$—, X: the compound of Formula 2 (m=0, l=3. R1: $CH_2CH=CH_2$)), the first additive, and the second additive were added to prepare a non-aqueous electrolyte solution.

As the first additive, vinyl ethylene carbonate (VEC) and fluoroethylene carbonate (FEC) were added.

As the second additive, polysiloxane (PS), succinonitrile (SN), hexane tricarbonitrile (HTCN), oxalyldifluoroborate (ODFB), and dicyclohexylcabodiimide (DCC) were added to prepare an electrolyte solution.

(1-2) Preparation of Lithium Secondary Battery

To 100 parts by weight of N-methyl-2-pyrrolidone (NMP), 40 parts by weight of solids obtained by mixing a ternary active material (Li(Ni$_{0.5}$Mn$_{0.3}$CO$_{0.2}$)O$_2$) as a positive electrode active material, carbon black as an electrically conductive material, and polyvinylidene fluoride (PVDF) as a binder in the ratio of 90:5:5 (wt. %) were added to prepare a slurry for the positive electrode active material. The slurry for the positive electrode active material was applied to a positive electrode current collector (Al thin film) having a thickness of 100 μm, and then dried and press-rolled to prepare a positive electrode.

To 100 parts by weight of NMP, 100 parts by weight of solids obtained by mixing graphene as a negative electrode active material, PVDF as a binder, and carbon black as an electrically conductive material in the ratio of 90:5:2:3 (wt. %) were added to prepare a slurry for the negative electrode active material. The slurry for the negative electrode active material was applied to a negative electrode current collector (Cu thin film) having a thickness of 90 μm, dried and press-rolled to prepare a negative electrode.

The positive electrode and the negative electrode prepared by the above method were laminated together with a safety reinforced separator (SRS®, LG Chem) to prepare an electrode assembly, and then the electrode assembly was placed in a pouch-type battery case, and the prepared non-aqueous electrolyte solution was respectively injected and sealed to prepare a lithium secondary battery with 4.45V, 4,500 mAh.

Example 8

A non-aqueous electrolyte solution and a lithium secondary battery were prepared in the same manner as in Example 7, except that 1.5 wt. % of VEC and 7 wt. % of FEC were used as the first additive.

Example 9

A non-aqueous electrolyte solution and a lithium secondary battery were prepared in the same manner as in Example 7, except that 0.5 wt. % of VEC and 5 wt. % of FEC were used as the first additive.

Comparative Example 5

A non-aqueous electrolyte solution and a lithium secondary battery were prepared in the same manner as in Example 7, except that the compound of Formula 1 was not used.

Comparative Example 6

A non-aqueous electrolyte solution and a lithium secondary battery were prepared in the same manner as in Example 7, except that only VEC was used as the first additive.

Comparative Example 7

A non-aqueous electrolyte solution and a lithium secondary battery were prepared in the same manner as in Example 7, except that only FEC was used as the first additive.

Experimental Example 3: Measurement of High Temperature Performance and Lifetime Characteristics Lithium secondary batteries prepared in Examples 7 to 9 and Comparative Examples 5 to 7 were operated under a voltage condition of 3V to 4.45V to measure recovery capacity, low temperature lifetime, heating value, and hot box improvement degree in the following manner, and then the results are shown in Table 6 below. At this time, the relative heating value (%) was calculated as a relative heating value compared to the lithium secondary battery of Comparative Example 5 instead of Comparative Example 1 in Equation 1 above.

As a result, it was confirmed that in the case of Examples 7 to 9, the recovery capacity was improved compared to Comparative Examples 5 to 7.

In addition, it was confirmed that in the case of Examples 7 to 9, the low, room, and high temperature lifetime characteristics were improved compared to Comparative Examples 5 to 7.

In addition, it was confirmed that in the case of Examples 7 to 9, the heating values were reduced compared to Comparative Examples 5 to 7.

In the above, although the present invention has been described by limited examples and drawings, the present invention is not limited thereto, and of course, various modifications and variations are possible by those of ordinary skill in the art to which the present invention pertains within the scope of equivalents of the technical spirit of the present invention and the claims to be described below.

The invention claimed is:

1. An electrolyte solution for a lithium secondary battery, the electrolyte solution comprising:
   an organic solvent,
   a lithium salt, and
   a polymer compound represented by Formula 1 below:

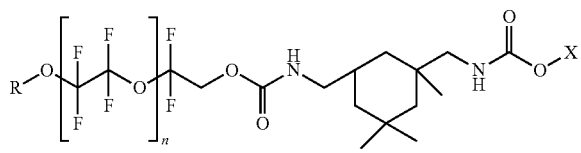

<Formula 1> wherein n is an integer of 1 to 300,

R is a hydrogen, a halogen, an alkyl group having 1 to 6 carbon atoms, a halogen-substituted alkyl group having 1 to 6 carbon atoms, an alkoxy group having 1 to 6 carbon atoms, or a halogen-substituted alkoxy group having 1 to 6 carbon atoms, and

TABLE 6

| | Recovery capacity (%) | Lifetime characteristics (%) | | Heating value (%) | Hot box experiment | |
|---|---|---|---|---|---|---|
| | | Room temperature (800th) | High temperature (600th) | | 135° C. | 140° C. |
| Example 7 | 89.6 | 85.5 | 81.7 | 52 | Pass | Pass |
| Example 8 | 92.6 | 86.4 | 82.2 | 45 | Pass | Pass |
| Example 9 | 91.4 | 87.3 | 81.8 | 50 | Pass | Pass |
| Comparative Example 5 | 66.9 | >60 | >60 | 100 | Fail | Fail |
| Comparative Example 6 | 70.7 | >60 | >60 | 100 | Fail | Fail |
| Comparative Example 7 | 85.2 | 82.4 | 78.0 | 59 | Fail | Fail |

X is a functional group represented by Formula 2 below:

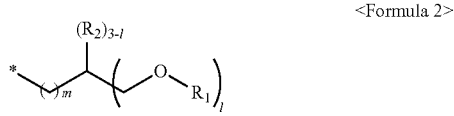

<Formula 2> wherein
m is 0 to 4,
l is 1 to 3,
R₁ is an unsaturated hydrocarbyl group having 2 to 6 carbon atoms, or a halogen-substituted unsaturated hydrocarbyl group having 2 to 6 carbon atoms,
R₂ is a hydrogen, a halogen, a saturated alkyl group having 1 to 6 carbon atoms, an unsaturated hydrocarbyl group having 2 to 6 carbon atoms, a halogen-substituted saturated alkyl group having 1 to 6 carbon atoms, or a halogen-substituted unsaturated hydrocarbyl group having 2 to 6 carbon atoms, and
each of R₁ and R₂ is the same as or different from each other.

2. The electrolyte solution for the lithium secondary battery according to claim 1, wherein the polymer compound represented by the Formula 1 is contained in an amount of 0.1 to 5 wt. % based on a total weight of the electrolyte solution.

3. The electrolyte solution for the lithium secondary battery according to claim 1, further comprising an additive comprising a first additive that includes a salt-based additive, a nitrile-based compound, or an ethylene carbonate-based compound.

4. The electrolyte solution for the lithium secondary battery according to claim 3, wherein
the salt-based additive comprises at least one selected from the group consisting of LiBF₄, lithium bis(oxalato)borate (LiBOB), lithium difluoro(oxalato)borate (LiODFB), lithium difluorophosphate (LiDFP), and lithium difluoro bis(oxalato)phosphate (LiDFOP),
the nitrile-based compound comprises at least one selected from the group consisting of succinonitrile (SN), dicyanobutene (DCB), ethylene glycol bis(propionitrile)ether (ASA3), hexane tri-cyanide (HTCN), and adipo nitrile (ADN), and
the ethylene carbonate-based compound comprises vinyl ethylene carbonate (VEC) and fluoroethylene carbonate (FEC).

5. The electrolyte solution for the lithium secondary battery according to claim 3, wherein
the salt-based additive, if present, is contained in an amount of 0.1 to 5 wt. % based on a total weight of the electrolyte solution,
the nitrile-based compound, if present, is contained in an amount of 0.05 to 10 wt. % based on the total weight of the electrolyte solution, and
the ethylene carbonate-based compound, if present, is contained in an amount of 0.02 to 15 wt. % based on the total weight of the electrolyte solution.

6. The electrolyte solution for the lithium secondary battery according to claim 3, wherein the first additive includes the salt-based additive, and the additive further comprises a second additive comprising at least one selected from the group consisting of vinyl ethylene carbonate (VEC), vinylene carbonate (VC), fluoroethylene carbonate (FEC), polysiloxane (PS), ethylene sulfate (ESa), succinonitrile (SN), oxalyldifluoroborate (ODFB), dicyclohexylcabodiimide (DCC), 1,3-propene sultone (PRS), ethylene glycol bis (propionitrile) ether (ASA3), adipo nitrile (ADN), hexane tri-cyanide (HTCN), dicyanobutene (DCB), fluoro benzene (FB), and propargyl 1H-imidazole-1-carboxylate (PIC).

7. The electrolyte solution for the lithium secondary battery according to claim 3, wherein the first additive includes the nitrile-based compound, and the additive further comprises a second additive comprising at least one selected from the group consisting of vinyl ethylene carbonate (VEC), vinylene carbonate (VC), fluoroethylene carbonate (FEC), polysiloxane (PS), ethylene sulfate (ESa), succinonitrile (SN), oxalyldifluoroborate (ODFB), dicyclohexylcabodiimide (DCC), 1,3-propene sultone (PRS), fluoro benzene (FB), and propargyl 1H-imidazole-1-carboxylate (PIC).

8. The electrolyte solution lithium secondary battery according to claim 3, wherein the first additive includes the ethylene carbonate-based compound, and the additive further comprises a second additive comprising at least one selected from the group consisting of vinylene carbonate (VC), polysiloxane (PS), ethylene sulfate (ESa), succinonitrile (SN), oxalyldifluoroborate (ODFB), dicyclohexylcabodiimide (DCC), 1,3-propene sultone (PRS), ethylene glycol bis (propionitrile) ether (ASA3), adipo nitrile (ADN), hexane tri-cyanide (HTCN), dicyanobutene (DCB), fluoro benzene (FB), and propargyl 1H-imidazole-1-carboxylate (PIC).

9. The electrolyte solution for the lithium secondary battery according to claim 6, wherein the second additive is contained in an amount of 5 to 30 wt. % based on a total weight of the electrolyte solution.

10. The electrolyte solution for the lithium secondary battery according to claim 1, wherein for R₁ and R₂, the unsaturated hydrocarbyl group having 2 to 6 carbon atoms, the halogen-substituted unsaturated hydrocarbyl group having 2 to 6 carbon atoms, or both includes an unsaturated alkene group that is present in a terminal of each of R₁ and R₂.

11. The electrolyte solution for the lithium secondary battery according to claim 10, wherein the unsaturated alkene group is a vinyl group.

12. The electrolyte solution for the lithium secondary battery according to claim 1, wherein the organic solvent comprises at least one selected from the group consisting of a carbonate-based organic solvent, an ester-based organic solvent, an ether-based organic solvent, a propionate-based organic solvent, and a fluorine-based organic solvent.

13. The electrolyte solution for the lithium secondary battery according to claim 1, wherein the lithium salt comprises at least one selected from the group consisting of LiPF₆, lithium bis(fluorosulfonyl) (LiFSI), and lithium bis (trifluoromethanesulfonyl)imide (LiTFSI).

14. A lithium secondary battery comprising:
a positive electrode;
a negative electrode;
a separator interposed between the positive electrode and the negative electrode; and
the electrolyte solution of claim 1.

15. The electrolyte solution for the lithium secondary battery according to claim 1, wherein R₁ is the unsaturated hydrocarbyl group, and the unsaturated hydrocarbyl group is an alkene having 2 to 6 carbon atoms.

16. The electrolyte solution for the lithium secondary battery according to claim 15, wherein the unsaturated hydrocarbyl group is an alkenyl having 3 carbon atoms.

17. The electrolyte solution for the lithium secondary battery according to claim 16, wherein the alkenyl having 3 carbon atoms is —CH$_2$CH═CH$_2$.

18. The electrolyte solution for the lithium secondary battery according to claim 1, further comprising a salt-based additive that includes at least one selected from the group consisting of LiBF$_4$, lithium bis(oxalato)borate (LiBOB), and lithium difluoro bis(oxalato)phosphate (LiDFOP),
   wherein R$_2$ is present, and R$_2$ is a halogen-substituted saturated alkyl group having 1 to 6 carbon atoms.

19. The electrolyte solution for the lithium secondary battery according to claim 1, further comprising an additive comprising a nitrile-based compound that includes at least one selected from the group consisting of succinonitrile (SN), hexane tri-cyanide (HTCN), and dicyanobutene (DCB),
   wherein the polymer compound represented by the Formula 1 is contained in an amount of 0.1 to 3 wt. % based on a total weight of the electrolyte solution.

20. The electrolyte solution for the lithium secondary battery according to claim 1, further comprising an additive comprising an ethylene carbonate-based compound that comprises vinyl ethylene carbonate (VEC) and fluoroethylene carbonate (FEC),
   wherein in Formula 2, m is 0 and l is 3.

* * * * *